United States Patent Office 2,872,250
Patented Feb. 3, 1959

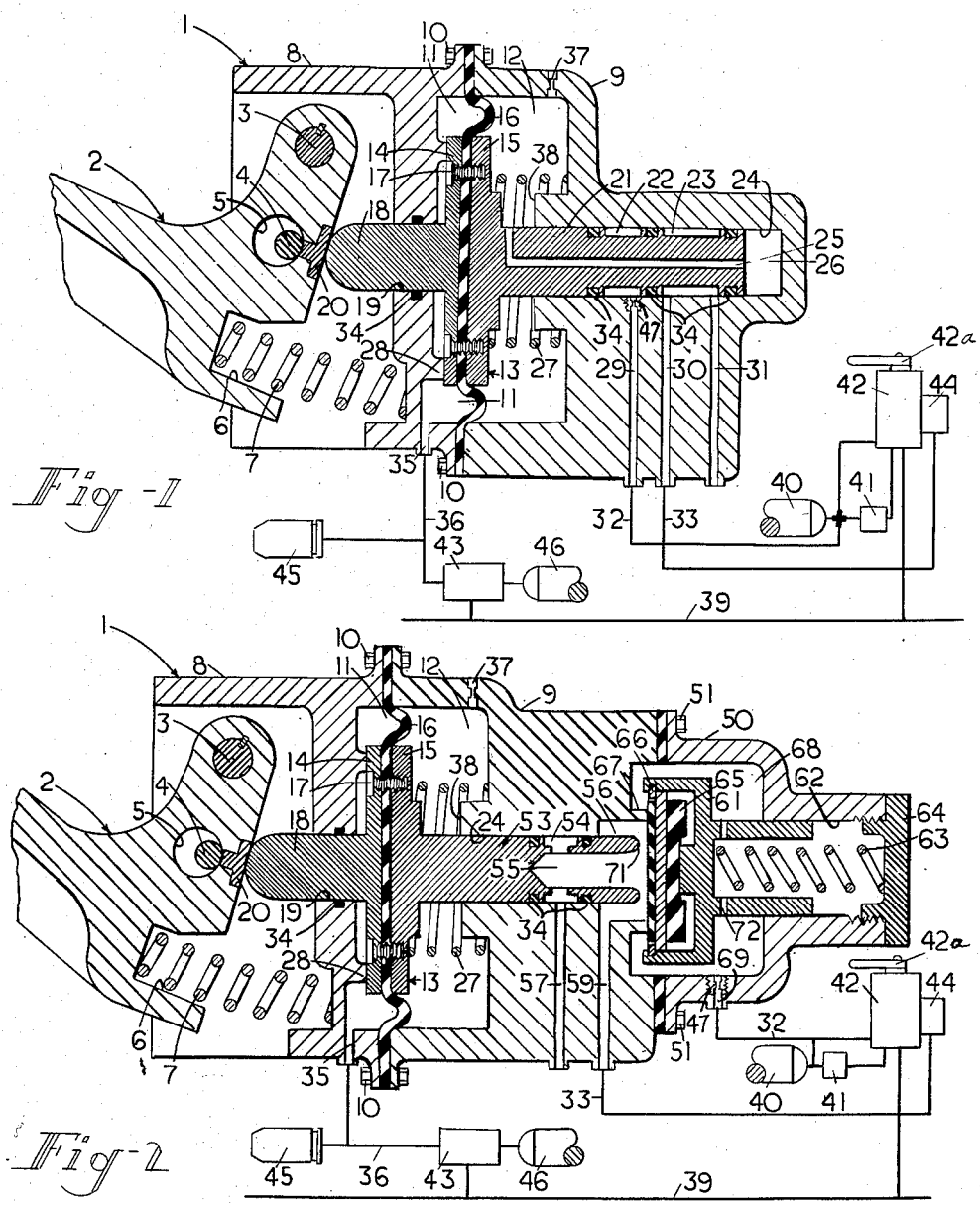

2,872,250

SAFETY CONTROL BRAKE APPARATUS

Erik G. Erson, Export, Pa., assignor to Westinghouse Air Brake Company, Wilmerding, Pa., a corporation of Pennsylvania Application December 13, 1956, Serial No. 628,127

3 Claims. (Cl. 303—19)

This invention relates to safety control fluid pressure brake equipment for railway vehicles wherein "deadman" application is automatically suppressed when the vehicle brakes are applied with a braking force in excess of a predetermined degree.

Railway fluid pressure brake equipments having the deadman feature are commonly provided with a foot-operated valve device, operative when physical pressure on the pedal thereof is relieved, to reduce the pressure of fluid in a so-called safety control pipe and thereby cause an automatic "deadman" full service or emergency application of the brakes, dependent on the type of safety control equipment used. Safety control equipments featuring the "deadman" application are of two types, one in which the "deadman" application is a full service application and another in which the "deadman" application is an emergency application. Although this "deadman" feature is useful to keep the operator alert and is necessary for safety reasons, it is desirable that the operator be relieved of the necessity of maintaining foot-applied pressure on the foot valve when he has demonstrated his alertness by performing another control operation, such as operating the brake valve manually to effect a brake application. In such cases it is desirable to automatically suppress the "deadman" full service or emergency application to eliminate unnecessary recharging operations explained hereinafter. In order to prevent such "deadman" applications, hereinafter referred to as safety control applications, a valve device known as a safety control cut-off valve is commonly provided to prevent reduction of the pressure of fluid in the safety control pipe when a fluid pressure exceeding a predetermined pressure is established in the brake cylinder by normal manually operated brake valve means to effect what is hereinafter referred to as a normal brake application, thus enabling the operator to release the physically applied pressure on the foot-operated valve device without effecting a full service or emergency safety control application.

The principal object of my invention is to provide a safety control brake apparatus including a novel combined foot-operated valve and safety control cut-off valve.

Another object of my invention is to provide safety control brake apparatus having an improved foot-operated valve of novel structure for enabling said valve to serve the dual function of the usual safety control cut-off valve and a foot valve.

Another object of my invention is to provide a safety control brake apparatus having an improved foot-operated diaphragm valve operatively controlled by brake cylinder pressure to suppress a deadman application.

Still another object of my invention is to provide a simplified combined foot-operated valve and safety control cut-off valve that may replace the separate foot valve and the separate cut-off valve and accompanying pipe connections in a safety control brake equipment.

These objects and other objects and advantages will become apparent from the following detailed description of the invention viewed in connection with the accompanying drawing wherein:

Fig. 1 is an elevational view in section of one embodiment of the combined foot valve and safety control cut-off valve device employing a piston type valve structure as utilized with a basic brake equipment shown diagrammatically.

Fig. 2 is an elevational view in section of a second embodiment of the combined foot valve and safety control cut-off valve device employing a poppet type valve structure as utilized with a basic brake equipment shown diagrammatically.

*Description—Fig. 1*

As shown in Fig. 1, the combined foot valve and safety control cut-off valve device comprises a valve body 1 having a foot pedal 2 secured thereto by a pivot pin 3 and a dowel pin 4 attached to the valve body and extending through a circular opening 5 in said foot pedal. The circular opening 5 is of greater diameter than the dowel pin 4 so as to permit a limited movement of the pedal 2 about the pivot pin 3 relative to the pin 4. Interposed between the valve body 1 and a recess 6 in the pedal 2 is a coil spring 7 which biases the pedal in a clockwise direction about the pivot pin 3 to a normal raised position determined by the engagement of the dowel pin 4 with the right-hand edge of the opening 5.

The valve body 1 is constructed in two portions 8 and 9 joined together by bolts 10. Formed within the valve body 1 are two chambers 11 and 12 separated by a diaphragm piston 13. The diaphragm piston 13 is comprised of two backing plates 14 and 15 secured to opposite sides of a flexible diaphragm 16 by suitable means such as bolts 17. Integrally formed with the backing plate 14 is an operating stem 18 extending through the chamber 11 and a bore 19 in the valve body portion 8 and engaging the foot pedal 2 at a button 20. Integrally formed with the backing plate 15 is a spool valve 21 having annular grooves 22 and 23 on the outer periphery thereof, slidable within a bore 24 in the valve body portion 9. A passage 25 extends lengthwise in said spool valve establishing communication between chamber 12 and a chamber 26 formed by the spool valve 21 and the valve body portion 9 in the bore 24. A spring 27 in chamber 12 biases the diaphragm piston 13 to the left to a normal position in which the backing plate 14 is seated against a circular rib 28. Passages 29, 30, and 31 in the valve body portion 9 are utilized to connect the annular grooves 22 and 23 to a main reservoir pipe 32, a safety control pipe 33 and atmosphere respectively.

A plurality of O rings 34 are utilized between various chambers to insure against leakage of fluid under pressure at positions shown in the drawing.

A passage 35 in the valve body portion 8 connects chamber 11 to a brake cylinder pipe 36.

A choke 37 connects chamber 12 to atmosphere through the wall of the valve body portion 9.

The combined foot valve and safety control cut-off valve device is illustrated as included in a basic brake equipment comprising a brake pipe 39 adapted to be supplied with fluid under pressure from a main reservoir 40 under the control of a feed valve 41 and a brake valve 42 having a handle 42a, a control valve 43, an application valve device 44 connected to and operative in conjunction with the brake valve 42, a brake cylinder 45, and an auxiliary reservoir 46.

Operation—Fig. 1

The combined foot valve and safety control cut-off valve device in Fig. 1 is shown in a position assumed when no foot pressure is applied to the foot pedal 2. A normal operating position of the valve 21 is defined when a downward foot pressure is maintained applied to the pedal 2 to pivot the pedal about the pivot pin 3 and compress the spring 7 such that button 20 engages the outer end of the operating stem 18 of the diaphragm piston 13 to effect movement thereof to the right against the force of spring 27 until the diaphragm piston 13 engages a shoulder 38 of the valve body portion 9. In the operating position, the annular groove 22 connects the main reservoir pipe 32 to the safety control pipe 33 via passage 29, choke 47, and passage 30, and the exhaust passage 31 is blanked by the annular groove 23. The chamber 11 is connected to the brake cylinder pipe 36 via passage 35 at all times regardless of the position of the diaphragm piston.

The brake valve 42 comprises a well-known rotary type valve (not shown) operable by movement of the usual brake valve handle 42a into a running position to establish a fluid pressure supply or brake pipe charging communication from the main reservoir 40 via the feed valve 41. The application valve device 44 attached to the brake valve 42 comprises an application piston (not shown) subject opposingly to constant main reservoir pressure in a main reservoir chamber (not shown) on one side thereof and pressure of fluid in a safety control chamber (not shown) connected to the safety control pipe 33 on the opposite side thereof, said pressure in the safety control pipe being supplied from the main reservoir 40 via pipe 32, choke 47, passage 29, annular groove 22 and passage 30. A spring (not shown) within said application valve device maintains the mentioned application piston (not shown) in a normal position to blank both a brake pipe exhaust port (not shown) and a safety control pipe branch port (not shown) leading to an exhaust port (not shown) in the rotary valve seat while said rotary valve is in running position.

In the event of an emergency situation such as an accident happening to the operator in which the foot-applied pressure is removed from the pedal 2, the spring 7 will move the pedal upward and the spring 27 will move the diaphragm piston 13 to the left into the application position in which it is shown in the drawing. In the application position, the annular groove 22 blanks the passage 29 from the main reservoir pipe 32, and the annular groove 23 establishes communication from the safety control pipe 33 to atmosphere via passages 30 and 31 to vent the safety control pipe 33 to cause the application valve device 44 to be positioned in its application position to initiate a safety control brake application explained hereinafter. A safety control brake application is effected by venting the safety control pipe 33 and connected mentioned safety control chamber of the mentioned application piston to unbalance the fluid pressure acting on the application piston to permit the main reservoir pressure in the mentioned main reservoir chamber to position the application valve in an application position thereby opening the previously mentioned brake pipe exhaust port and safety control pipe branch port to vent the brake pipe and establish a safety control pipe vent via the mentioned branch port and the rotary valve while said rotary valve is in running position.

Reduction of pressure in the brake pipe results in operation of the control valve 43 to cause supply of fluid under pressure from the auxiliary reservoir 46 to the brake cylinder 45 in manner well understood in the braking art. The pressure in the brake cylinder due to a safety control application increases to a full service or emergency degree as called for by the particular type of equipment, however, the consequent increase of pressure in chamber 11 of the foot valve device although sufficient to position the diaphragm piston 13 in the operating position does not limit the degree of brake application when the exhaust passage 31 is again blanked off because of the operation of the application valve 44 previously described continues to vent the safety control pipe 33 via the safety control branch port and rotary valve (not shown) in running position.

In order to release a brake application following a safety control operation, the operator must again depress the foot pedal 2 of the foot valve device and position the brake valve handle 42a in its lap position. Positioning the brake valve handle 42a in lap position effects operation of the rotary valve (not shown) of the brake valve to blank off the venting of the safety control pipe 33 via the mentioned safety control pipe branch port and the rotary valve and opens a recharge port (not shown) to permit a slow recharge of the brake pipe 39 from the feed valve 41 and thereby effect operation of the control valve 43 to release fluid pressure in the brake cylinder 45.

In that the just described release procedure involves a lengthy brake pipe recharge time and other procedure time penalties known to those skilled in the braking art, it is desirous to provide means for suppressing a safety control application if it becomes necessary to remove the foot-applied pressure on the foot pedal 2.

In order to remove the foot-applied pressure from the pedal without effecting such a safety control application, a normal brake application greater than a predetermined degree of for example 25 p. s. i. is made by positioning the usual brake valve 42 in a service application position. With the brake valve 42 in such application position, the rotary valve (not shown) thereof is positioned to permit a fluid pressure reduction in the brake pipe pressure of a predetermined degree of for example 25 p. s. i. by manual operation of brake valve handle 42a by the operator to effect operation of the control valve 43 to supply a corresponding fluid pressure of 25 p. s .i. in the brake cylinder 45 and thereby establish a pressure of 25 p. s. i. in the connected chamber 11 of the valve body 1 by way of the brake cylinder pipe 36 and passage 35. Fluid under pressure of 25 p. s. i. or more in chamber 11 will cause the diaphragm piston to move to the right and be maintained in the previously described operating position against the shoulder 38 in opposition to the forces of spring 27, thereby maintaining the safety control pipe 33 connected to the main reservoir pipe 32 to prevent a safety control application and the consequent requirement for lengthy recharge of the system. A release of a brake application following the just described normal brake application is accomplished by positioning the brake valve handle 42a in a release or running position to recharge the brake pipe 39 in the usual manner.

Description—Fig. 2

The combined foot valve and safety control cut-off valve device shown in Fig. 2 is similar to that shown in Fig. 1 with the exception that a poppet type valve structure is employed in the place of the piston and spool valve structure of Fig. 1. Insofar as the embodiment in Fig. 2 is similar to that of Fig. 1, the same reference numerals are employed to identify the parts in Fig. 2 without further description. Components and parts of Fig. 2 differing from or additional to those in Fig. 1 are identified by new reference numerals. In Fig. 2, the valve body 1 is constructed in three portions 8, 9 and 50, portions 8 and 9 being joined together as by bolts 10, and portions 9 and 50 being joined together as by bolts 51. The diaphragm piston 13 of Fig. 2 has integrally formed with the backing plate 15 thereof, a spool valve and stem 53 having an annular groove 54 on the outer periphery thereof, said groove being open at intervals on the inner periphery to a drilled passage 55 within said spool valve and stem, said spool valve and stem being slidable within a bore 24 of the valve body portion 9. The drilled passage 55 establishes communication between a chamber 56 and an exhaust passage 57 via the annular groove 54 to connect said chamber 56 to atmosphere while said diaphragm piston 13 is positioned to the left in the previously described operating position of said diaphragm piston 13. When said diaphragm piston 13 is positioned to the left as shown, chamber 56 is also connected via passage 59 in the valve body 9 to the safety control pipe 33. Encased in the valve body portion 50 is a disc valve 61 slidably mounted in a bore 62 of said valve body 50 and positioned to the left by a spring 63 enclosed in said bore and seated on a threaded cap 64, said disc valve having a valve seating portion 65 movably mounted within said disc valve and secured by a snap ring 66. This valve seating portion 65 is adapted to be seated on an annular seat rib 67 of the valve body 9. A chamber 68 within said valve body portion 50 is connected by a choke port 69 to main reservoir pipe 32. The disc valve 61 is normally biased to the left as previously stated by the spring 63. However, an annular seating rib 71 on the outer extremity of the spool valve and stem 53 is adapted to contact the valve seating portion 65 to move said disc valve 61 to the right in opposition to the spring 63 when pressure is applied to the foot pedal 2.

As in Fig. 1, O-rings 34 are utilized between various chambers to insure against leakage of fluid under pressure at positions shown in the drawing.

A plurality of passages 72 are drilled in the slidable part of the valve 61 to permit free passage of fluid between the chamber in which spring 63 is housed and the chamber 68, thereby preventing dash-pot action of the valve in the bore 62.

*Operation—Fig. 2*

The combined foot valve and safety control cut-off valve device shown in Fig. 2 is shown in the position assumed when no pressure is applied to the foot pedal 2. A normal "operating position" is defined when a downward pressure is maintained applied to the pedal 2 to pivot the pedal about the pivot pin 3 and compress the spring 7 such that the button 20 engages the outer end of the operating stem 18 of the diaphragm piston 13 to effect movement thereof to the right against the force of spring 27 until the seating rib 71 of spool valve and stem 53 engages the valve seating portion 65 of the disc valve 61 to cause said valve seating portion 65 and said disc valve 61 to move to the right against the force of spring 63. In this operating position, the seating rib 71 in the outer extremity of the spool valve and stem 53 is seated against the valve seating portion 65 to close off communication between chamber 56 and the exhaust passage 57, and the movement of the disc valve 61 and the valve seating portion 65 to the right to unseat said valve seating portion 65 from the seat rib 67 establishes communication between the main reservoir pipe 32 and the safety control pipe 33 via said passage 69, chamber 68, past the seating rib 67 to chamber 56 and passage 59. The chamber 11 is connected to the brake cylinder pipe 36 via passage 35 regardless of the position of the diaphragm piston 13.

In the event of emergency situations such as an accident to the operator in which pressure is removed from the pedal 2, the spring 7 will move the pedal upward and the spring 27 will move the diaphragm piston 13 to the left to the "application position" shown in the drawing. In this "application position," the annular groove 54 is open to the exhaust passage 57 thereby permitting venting of the safety control pipe 33 via passage 59, chamber 56 past the seating rib 71 to the drill passage 55 and annular groove 54 and exhaust passage 57 to atmosphere. Venting of said safety control pipe in a manner just described effects initiation of a safety control brake application in the manner common to safety control equipment as explained in the operation of the equipment shown in Fig. 1.

If it is necessary to remove the foot-applied pressure from the pedal 2 without effecting an automatic safety control application, a procedure similar to that described for the embodiment shown in Fig. 1 is followed. The operator must manually make a normal brake application greater than a predetermined degree of for example 25 p. s. i. by the usual brake valve means 42, thereby establishing a pressure of 25 p. s. i. in the brake cylinder 45 and chamber 11 of the valve body 1 by way of the brake cylinder pipe 36 and passage 35 to maintain the diaphragm piston 13 to the right to effect positioning of the valve seating portion 65 and the disc valve 61 in the "operating position" previously described.

*Summary*

It can be seen from the above description of the two embodiments of the combined foot valve and safety control cut-off valve device that a normal operating position of said devices is maintained as long as the operator maintains foot-applied pressure on the foot pedal 2 to keep the elements of said valve device in their operating position. If an emergency situation arises where the foot-applied pressure is inadvertently removed, an automatic safety control brake application is effected. If, however, it is necessary to remove the foot-applied pressure without effecting a safety control application, a brake application by the normal brake valve means 42 is made, said application being of 25 p. s. i. or more to maintain the valve devices in their operation position and thereby prevent a safety control application and the accompanying lengthy recharge time necessitated thereby.

If the two embodiments shown herein are to be used in equipments in which there is no main reservoir pipe connection to the foot valve device, the connection of main reservoir pipe 32 at passage 29 of embodiment shown in Fig. 1 may be blanked off, and in embodiment shown in Fig. 2, the valve body portion 50 including the valve 61 may be removed and a blanking cover added at the bolts 51. If desired, a whistle or other warning means may be attached at the exhaust passage 31 of the embodiment shown in Fig. 1 or at the exhaust passage 57 of the embodiment shown in Fig. 2.

While I have illustrated and described two embodiments of my invention it is to be understood that these embodiments are capable of variation and modification and I therefore do not wish to be limited to the precise details set forth but to avail myself of such alterations as fall within the scope of the following claims.

Having now described my invention, what I claim as new and desire to secure by Letters Patent, is:

1. A foot valve means for use in a safety control brake equipment of the type comprising a brake cylinder means, a brake pipe, a main reservoir, brake valve means operable to control supply of fluid under pressure from said main reservoir to said brake pipe, control valve means operably responsive to variation of fluid pressure in said brake pipe to control supply of fluid under pressure to said brake cylinder means, a safety control pipe, application valve means operably responsive to release of fluid pressure in said safety control pipe to effect a safety control brake application, said foot valve means comprising a valve body encasing a fluid pressure chamber and a spool valve means having a valve stem, a foot pedal hingedly supported on said valve body for limited movement relative thereto by foot-applied pressure from a raised position to a lowermost position, said spool valve means and valve stem operable upon a predetermined depression of said foot pedal from its raised position to a lowermost position to move to one position and operable upon release of said foot-applied pressure to move to a second position, disc valve means operable to a first position by said valve stem while in said one position, said spool valve means being operable in said one position cooperatively with said disc valve means in said first position to establish communication between said main reservoir and said safety control pipe for charging said safety control pipe, said spool valve means being operable in said second position to effect release of fluid pressure from said safety control pipe to cause operation of said application valve means to effect a safety control brake application, and fluid pressure responsive means effective when subject to a predetermined fluid pressure in said fluid pressure chamber established in correspondence with the fluid pressure established in said brake cylinder means incident to a brake application effected by said brake valve means and said control valve means for maintaining said spool valve means in its said one position irrespective of the foot-applied pressure on said foot valve.

2. A foot valve device for use in a safety car control brake equipment of the type having a manually operated brake valve, a safety control pipe, a main reservoir pipe and a brake cylinder, said foot valve device comprising in combination, a valve body, a foot pedal hingedly supported on the valve body for limited movement relative thereto by foot-applied pressure from a raised position to a lowermost position, diaphragm means mounted within the valve body having at one side thereof a fluid pressure chamber to which fluid under pressure is supplied in correspondence with that established in said brake cylinder and having valve means attached on the opposite side thereof, said valve means being operable responsively to movement of said foot pedal by foot pressure to be moved to one position to effect establishment of communication between said main reservoir pipe and said safety control pipe and being biased upon release of said foot pressure to be moved to a second position to effect establishment of communication between said safety control pipe and atmosphere to cause a safety control brake application, said diaphragm means being effective when subject to a predetermined fluid pressure in said fluid pressure chamber, corresponding to that supplied to the brake cylinder incident to a brake application effected by said manually operated brake valve, to maintain said valve means in its said one position regardless of said foot pressure on said foot pedal.

3. A foot valve device for use in a safety control brake equipment of the type including a brake pipe, brake cylinder means, a main reservoir, brake valve means operative to control the charging of said brake pipe from the main reservoir and the reduction of pressure in the brake pipe, control valve means operably responsive to variation of the pressure in the brake pipe to effect the supply of fluid under pressure to the said brake cylinder means and the release of fluid under pressure therefrom, a normally charged safety control pipe, and application valve means responsive to reduction of the pressure in said safety control pipe to cause fluid under pressure to be supplied to said brake cylinder to effect a safety control brake application, said foot valve device comprising a sectionalized casing, a diaphragm having its periphery clamped between sections of said casing and forming therewith a first chamber at one side thereof to which fluid under pressure is supplied in correspondence with the fluid under pressure supplied to said brake cylinder responsively to operation of said brake valve means, and a second chamber at the opposite side thereof constantly open to atmosphere, a spool valve element coaxially secured to one side of said diaphragm and operating in a closed bore in one of said casing sections, said spool valve element having a longitudinal passage through which the closed end of said bore is in constant communication to atmosphere in said second chamber, and two longitudinally spaced annular grooves, a follower element secured to the opposite face of said diaphragm within said first chamber and engageable with said casing to limit the movement of said diaphragm in the direction of said first chamber, spring means interposed between said diaphragm and said casing within said second chamber for biasing said diaphragm to a position determined by engagement of said follower element with said casing, a foot pedal pivotally mounted on one of said casing sections, said follower element having a stem extending coaxially to said diaphragm through the wall of said casing section to the exterior thereof and engageable by said foot pedal, said foot pedal being effective upon application of pressure thereto to exert a force via said follower element and said diaphragm to move said spool valve element in opposition of the yielding force of said spring means from a first position in which the follower element engages said casing to a second position, one of said grooves in said spool valve element being effective in said one position of said spool valve element to establish communication between two ports opening into the said bore, one of which ports is constantly open to atmosphere and the other of which is connectable to said safety control pipe, the second of said grooves in said spool valve element being effective in the second position of said spool valve element to establish communication between the other of said ports and a third port also opening into said bore and connectable to said main reservoir whereby to effect charging of the safety control pipe.

References Cited in the file of this patent

UNITED STATES PATENTS

| | | |
|---|---|---|
| 1,530,487 | Fitch | Mar. 24, 1925 |
| 2,103,274 | Sanford | Dec. 28, 1937 |
| 2,263,330 | Farmer | Nov. 18, 1941 |
| 2,711,932 | Laber | June 28, 1955 |